US010361561B2

(12) United States Patent
Wu et al.

(10) Patent No.: US 10,361,561 B2
(45) Date of Patent: Jul. 23, 2019

(54) DISPATCHING METHOD AND DEVICE FOR INTEGRATED TRANSMISSION AND DISTRIBUTION NETWORK

(71) Applicant: Tsinghua University, Beijing (CN)

(72) Inventors: Wenchuan Wu, Beijing (CN); Boming Zhang, Beijing (CN); Hongbin Sun, Beijing (CN); Chenhui Lin, Beijing (CN); Qinglai Guo, Beijing (CN); Bin Wang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 13 days.

(21) Appl. No.: 15/803,829

(22) Filed: Nov. 5, 2017

(65) Prior Publication Data

US 2018/0241209 A1    Aug. 23, 2018

(30) Foreign Application Priority Data

Feb. 17, 2017    (CN) .......................... 2017 1 0087438

(51) Int. Cl.
*H02J 3/12* (2006.01)
*G05F 1/66* (2006.01)
(Continued)

(52) U.S. Cl.
CPC ................. *H02J 3/12* (2013.01); *G05F 1/66* (2013.01); *G06F 17/11* (2013.01); *G06Q 50/06* (2013.01);
(Continued)

(58) Field of Classification Search
CPC ...... H02J 3/12; H02J 3/00; H02J 3/008; H02J 2003/007; G05F 1/66; G06F 17/11;
(Continued)

(56) References Cited

U.S. PATENT DOCUMENTS 7,660,649 B1 *  2/2010  Hope ..................... G06Q 10/04
                                                                 700/28
2004/0246643 A1 * 12/2004  Chen ......................... H02J 3/00
                                                                 361/115

(Continued)

OTHER PUBLICATIONS

Madani, Ramtin, Somayeh Sojoudi, and Javad Lavaei. "Convex relaxation for optimal power flow problem: Mesh networks." IEEE Transactions on Power Systems 30.1 (2015): 199-211. (Year: 2015).*

(Continued)

*Primary Examiner* — Brian W Wathen
*Assistant Examiner* — Alicia M. Choi
(74) *Attorney, Agent, or Firm* — Hodgson Russ LLP

(57) ABSTRACT

The present disclosure provides a dispatching method and a dispatching device for an integrated transmission and distribution network. The integrated transmission and distribution network includes a transmission network and at least one distribution network. The method includes: establishing a dispatch model of the integrated transmission and distribution network, in which dispatch model includes an objective function and constraints, the objective function is a minimizing function of a total generation cost of the transmission network and the at least one distribution network under the constraints; solving the dispatch model to obtain dynamic dispatch parameters for the integrated transmission and distribution network; and dispatching the integrated transmission and distribution network according to the dynamic dispatch parameters.

17 Claims, 2 Drawing Sheets

(51) Int. Cl.
*G06F 17/11* (2006.01)
*G06Q 50/06* (2012.01)
*H02J 3/00* (2006.01)

(52) U.S. Cl.
CPC ............... *H02J 3/00* (2013.01); *H02J 3/008* (2013.01); *H02J 2003/007* (2013.01); *Y02E 60/76* (2013.01); *Y04S 40/22* (2013.01); *Y04S 50/10* (2013.01)

(58) Field of Classification Search
CPC ......... G06Q 50/06; Y02E 60/76; Y04S 40/22; Y04S 50/10
USPC ........................................................ 700/286
See application file for complete search history.

(56) References Cited

U.S. PATENT DOCUMENTS

| 2004/0249775 A1* | 12/2004 | Chen ...................... G06Q 50/06 706/21 |
| 2004/0260489 A1* | 12/2004 | Mansingh .............. G06Q 50/06 702/60 |
| 2015/0310366 A1* | 10/2015 | Yu .......................... G06Q 50/06 705/7.22 |

OTHER PUBLICATIONS

Zhang, Yu, Nikolaos Gatsis, and Georgios B. Giannakis. "Robust energy management for microgrids with high-penetration renewables."&nsbp;IEEE Transactions on Sustainable Energy 4.4 (2013): 944-953. (Year: 2013).*

Lee, K. Y., Y. M. Park, and J. L. Ortiz. "A united approach to optimal real and reactive power dispatch." IEEE Transactions on power Apparatus and systems 5 (1985): 1147-1153. (Year: 1985).*

Li, Zhigang, et al. "Decentralized multi-area dynamic economic dispatch using modified generalized benders decomposition." IEEE Trans. Power Syst 31.1 (2016): 526-538. (Year: 2016).*

* cited by examiner

DISPATCHING METHOD AND DEVICE FOR INTEGRATED TRANSMISSION AND DISTRIBUTION NETWORK

CROSS-REFERENCE TO RELATED APPLICATION

This application claims priority to and benefits of Chinese Patent Application Serial No. 201710087438.1, filed with the State Intellectual Property Office of P. R. China on Feb. 17, 2017, the entire contents of which are incorporated herein by reference.

FIELD

The present disclosure relates to a field of power system operation and control technology, and more particularly to a dispatching method and a dispatching device for an integrated transmission and distribution network.

BACKGROUND

As large scale distributed renewable energy resources are integrated into distribution networks, payload of the distribution networks changes dramatically and has a strong unpredictability, and power between a transmission network and a distribution network changes rapidly. Traditional dynamic dispatch is conducted separately for the transmission network and the distribution network. However, it is easy to cause a power mismatch problem in boundary between the transmission network and the distribution network when the large scale distributed renewable energy resources are integrated. In addition, because the transmission network and the distribution network are operated by their own dispatch center respectively, operation information between them are private, global dispatch of integrated transmission and distribution networks can not be achieved, and a global optimal solution of integrated transmission and distribution networks can not be achieved by independent dispatch.

SUMMARY

Embodiments of the present disclosure provide a dispatching method for an integrated transmission and distribution network. The integrated transmission and distribution network includes a transmission network and at least one distribution network. The method includes: establishing a dispatch model of the integrated transmission and distribution network, in which the dispatch model includes an objective function and constraints, the objective function is a minimizing function of a total generation cost of the transmission network and the at least one distribution network under the constraints, solving the dispatch model to obtain dynamic dispatch parameters for the integrated transmission and distribution network; and dispatching the integrated transmission and distribution network according to the dynamic dispatch parameters.

Embodiments of the present disclosure provide a dispatching device for an integrated transmission and distribution network. The integrated transmission and distribution network includes a transmission network and at least one distribution network. The device includes a processor; and a memory for storing instructions executable by the processor, in which the processor is configured to perform the above dispatching method for an integrated transmission and distribution network.

Embodiments of the present disclosure provide a non-transitory computer-readable storage medium having stored therein instructions that, when executed by a processor of a computer, causes the computer to perform the above dispatching method for an integrated transmission and distribution network.

It is to be understood that both the foregoing general description and the following detailed description are exemplary and explanatory only and are not restrictive of the invention, as claimed.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

In order to make objectives, technical solutions and advantages of the present disclosure clearer, in the following the present disclosure will be described in detail with reference to drawings. Apparently, the described embodiments are only some embodiments of the present disclosure and do not represent all the embodiments. Based on the embodiment described herein, all the other embodiments obtained by those skilled in the art without creative labor belong to the protection scope of the present disclosure.

Figure 1:
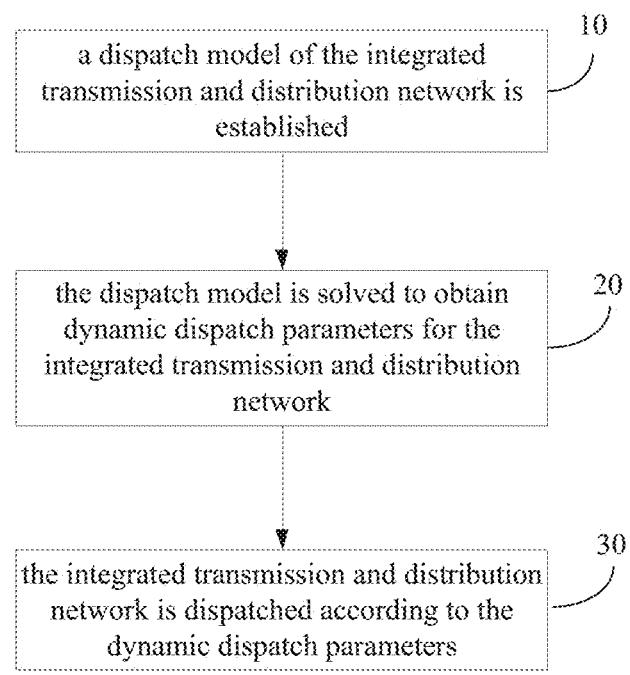
FIG. 1 is a flow chart of a dispatching method for an integrated transmission and distribution network according to an exemplary embodiment.

FIG. 1 is a flow chart of a dispatching method for an integrated transmission and distribution network according to an exemplary embodiment. The integrated transmission and distribution network includes a transmission network and at least one distribution network. As illustrated in FIG. 1, the method includes followings.

At block 10, a dispatch model of the integrated transmission and distribution network is established. The dispatch model includes an objective function and constraints. The objective function is a minimizing function of a total generation cost of the transmission network and the at least one distribution network under the constraints.

At block 20, the dispatch model is solved to obtain dynamic dispatch parameters for the integrated transmission and distribution network.

At block 30, the integrated transmission and distribution network is dispatched according to the dynamic dispatch parameters.

In the following, the method will be described in detail.

The method is a dynamic dispatching method based on multi-parametric programming. The multi-parametric programming relates to a mathematical optimization field, which can transform a quadratic programming problem with parameters into a piecewise quadratic function related to parameters.

(1) The Dispatch Model of the Integrated Transmission and Distribution Network is Established The dispatch model includes the objective function and the constraints. The objective function is a minimizing function of a total generation cost of the transmission network and the at least one distribution network under the constraints.

(1-1) The Objective Function of the Dispatch Model of the Integrated Transmission and distribution network The objective function of the dispatch model of the integrated transmission and distribution network aims to minimize a total generation cost of the transmission network and the at least one distribution network. The total generation cost of the transmission network and the at least one distribution network is established by a formula of:

$$\sum_{t \in T} \sum_{i \in G^{trans}} C_i^{trans}(pg_{i,t}^{trans}) + \sum_{t \in T} \sum_{k \in DIST} \sum_{i \in G^{dist,k}} C_i^{dist,k}(pg_{i,t}^{dist,k}) \quad (1)$$

where, T is an index set of dispatching time horizon, $G^{trans}$ is an index set of generator bus numbers in the transmission network, DIST is an index set of the at least one distribution network, $G^{dist,k}$ is an index set of generator bus numbers in a distribution network k, $C_i^{trans}(pg_{i,t}^{trans})$ is a cost function of a generator at a bus i of the transmission network during a period t, $pg_{i,t}^{trans}$ is a real power output of the generator at the bus i of the transmission network during the period t, $C_i^{dist,k}(pg_{i,t}^{dist,k})$ is a cost function of a generator at a bus i of the distribution network k during the period t, $pg_{i,t}^{dist,k}$ is a real power output of the generator at the bus i of the distribution network k during the period t.

In some embodiments of the present disclosure, $C_i^{trans}(pg_{i,t}^{trans})$ is expressed as:

$$C_i^{trans}(pg_{i,t}^{trans}) = a_{0,i}^{trans} + a_{1,i}^{trans} pg_{i,t}^{trans} + a_{2,i}^{trans}(pg_{i,t}^{trans})^2 \quad (2),$$

where, $a_{0,i}^{trans}$ is a constant coefficient of generation cost of the generator at the bus i of the transmission network, $a_{1,i}^{trans}$ is a linear coefficient of generation cost of the generator at the bus i of the transmission network, and $a_{2,i}^{trans}$ is a quadratic coefficient of generation cost of the generator at the bus i of the transmission network. $a_{0,i}^{trans}$, $a_{1,i}^{trans}$, and $a_{2,i}^{trans}$ are inherent parameters of the generator.

In some embodiments of the present disclosure, $C_i^{dist,k}(pg_{i,t}^{dist,k})$ is expressed as:

$$C_i^{dist,k}(pg_{i,t}^{dist,k}) = a_{0,i}^{dist,k} + a_{1,i}^{dist,k} pg_{i,t}^{dist,k} + a_{2,i}^{dist,k}(pg_{i,t}^{dist,k})^2 \quad (3)$$

where, $a_{0,i}^{dist,k}$ is a constant coefficient of generation cost of the generator at the bus i of the distribution network k, $a_{1,i}^{dist,k}$ is a linear coefficient of generation cost of the generator at the bus i of the distribution network k, and $a_{2,i}^{dist,k}$ is a quadratic coefficient of generation cost of the generator at the bus i of the distribution network k. $a_{0,i}^{dist,k}$, $a_{1,i}^{dist,k}$, and $a_{2,i}^{dist,k}$ are inherent parameters of the generator.

(1-2) The Constraints of the Integrated Transmission and Distribution Network

The constraints include constraints of the transmission network, constraints of the at least one distribution network, and boundary constraints.

(1-2-1) The Constraints of the Transmission Network

The constraints of the transmission network include power balance constraints, constraints of line transmission capacity of the transmission network, spinning reserve constraints, ramping constraints, and active power constraints of generators in the transmission network.

The power balance constraints are denoted by a formula of:

$$\sum_{i \in G^{trans}} pg_{i,t}^{trans} = \sum_{i \in B^{trans}} pb_{i,t}^{trans} + \sum_{i \in D^{trans}} PD_{i,t}^{trans}, \forall t \in T \quad (4)$$

where, $B^{trans}$ is an index set of boundary bus numbers between the transmission network and the at least one distribution network, $pb_{i,t}^{trans}$ is a transferred real power at the bus i of the transmission network to the at least one distribution network during the period t, $D^{trans}$ is an index set of load bus numbers of the transmission network, $PD_{i,t}^{trans}$ is a load predication value at the bus i during the period t.

The constraints of line transmission capacity of the transmission network are denoted by a formula of:

$$-PL_n^{trans} \leq \sum_{i \in G^{trans}} SF_{n-i}^{trans} pg_{i,t}^{trans} - \sum_{i \in B^{trans}} SF_{n-i}^{trans} pb_{i,t}^{trans} - \sum_{i \in D^{trans}} SF_{n-i}^{trans} PD_{i,t}^{trans} \leq PL_n^{trans}, \forall n \in L^{trans}, \forall t \in T \quad (5)$$

where, $PL_n^{trans}$ is an active power flow limit of a line n in the transmission network, $SF_{n-i}^{trans}$ is a shift distribution factor of the bus i on the line n, the shift distribution factor is a topological parameter of the integrated transmission and distribution network and can be directly obtained from a dispatching center of the integrated transmission and distribution network, $L^{trans}$ is an index set of line numbers of the transmission network.

The spinning reserve constraints of the transmission network are denoted by a formula of:

$$0 \leq ru_{i,t}^{trans} \leq RU_i^{trans} \Delta t, ru_{i,t}^{trans} \leq \overline{PG_i^{trans}} - pg_{i,t}^{trans}, \forall i \in G^{trans}, \forall t \in T \quad (6)$$

$$0 \leq rd_{i,t}^{trans} \leq RD_i^{trans} \Delta t, rd_{i,t}^{trans} \leq pg_{i,t}^{trans} - \underline{PG_i^{trans}}, \forall i \in G^{trans}, \forall t \in T$$

$$\sum_{i \in G^{trans}} ru_{i,t}^{trans} \geq SRU_t^{trans}, \sum_{i \in G^{trans}} rd_{i,t}^{trans} \geq SRD_t^{trans}, \forall t \in T$$

where, $ru_{i,t}^{trans}$ is an upward spinning reserve contribution of the generator at the bus i of the transmission network during the period t, $rd_{i,t}^{trans}$ is a downward spinning reserve contribution of the generator at the bus i of the transmission network during the period t, $RU_i^{trans}$ is an upward ramp rate of the generator at the bus i of the transmission network during the period t, $RD_i^{trans}$ is a downward ramp rate of the generator at the bus i of the transmission network during the period t, $\Delta t$ is a time interval for dispatching, a value of the time interval is determined according to a power dispatching demand. $\overline{PG_i^{trans}}$, is a maximum real power output of the generator at the bus i of the transmission network. $\underline{PG_i^{trans}}$ is a minimum real power output of the generator at the bus i of the transmission network, $SRU_t^{trans}$ is an upward spinning reserve capacity requirement of the transmission network during the period t, $SRD_t^{trans}$ is a downward spinning reserve capacity requirement of the transmission network during the period t.

The ramping constraints of the transmission network are denoted by a formula of:

$$-RD_i^{trans} \Delta t \leq pg_{i,t+1}^{trans} - pg_{i,t}^{trans} \leq RU_i^{trans} \Delta t,$$
$$\forall i \in G^{trans}, \forall t \in T \quad (7).$$

The active power constraints of generators in the transmission network are denoted by a formula of:

$$\underline{PG_i^{trans}} \leq pg_{i,t}^{trans} \leq \overline{PG_i^{trans}}, \forall i \in G^{trans}, \forall t \in T \quad (8).$$

(1-2-2) The Constraints of the at Least One Distribution Network

The constraints of the at least one distribution network include power flow constraints, constraints of line transmission capacity of each distribution network, and active power constraints of generators in each distribution network.

The power flow constraints of the at least one distribution network are denoted by a formula of:

$$\sum_{i:i\to j}\left(p_{i\to j,t}^{dist,k} - l_{i\to j,t}^{dist,k}\right) + p_{j,t}^{dist,k} = \sum_{m:j\to m} p_{j\to m,t}^{dist,k}, \forall j \in N^{dist,k}, \forall t \in T \quad (9)$$

where, $p_{i\to j,t}^{dist,k}$ is a line flow from a bus i to a bus j in a distribution network k during a period t, $l_{i\to j,t}^{dist,k}$ is a line loss from the bus i to the bus j in the distribution network k during the period t, $p_{j,t}^{dist,k}$ is an power injection at the bus j in the distribution network k during the period t, $N^{dist,k}$ is an index set of bus numbers of the distribution network k.

In some embodiments of the present disclosure, $p_{j,t}^{dist,k}$ is obtained according to a formula of:

$$p_{j,t}^{dist,k} = \begin{cases} pg_{j,t}^{dist,k} - PD_{j,t}^{dist,k} + pb_t^{dist,k}, \\ j \text{ is connected to the } k^{th} \text{ distribution network} \\ pg_{j,t}^{dist,k} - PD_{j,t}^{dist,k}, \\ j \text{ is not connected to the } k^{th} \text{ distribution network} \end{cases},$$

$\forall j \in N^{dist,k}, \forall t \in T$, where $pg_{j,t}^{dist,k}$ is a real power output of the generator at the bus j of the distribution network k during the period t, $PD_{j,t}^{dist,k}$ is a load predication value at the bus j of the distribution network k during the period t, and $pb_t^{dist,k}$ is a transferred real power from the transmission network to the distribution network k during the period t.

In some embodiments of the present disclosure, $l_{i\to j,t}^{dist,k}$ is obtained according to a formula of:

$$l_{i\to j,t}^{dist,k} = \left[(\hat{P}_{i\to j,t}^{dist,k})^2 + (\hat{Q}_{i\to j,t}^{dist,k})^2\right] R_{i\to j}^{dist,k} / (\hat{V}_{i,t}^{dist,k})^2 +$$

$$2\left(p_{i\to j,t}^{dist,k} - \hat{P}_{i\to j,t}^{dist,k}\right)\hat{P}_{i\to j,t}^{dist,k} R_{i\to j}^{dist,k} / (\hat{V}_{i,t}^{dist,k})^2, \forall (i\to j) \in L^{dist,k}, \forall t \in T,$$

where, $\hat{P}_{i\to j,t}^{dist,k}$ is operational base points of real power from a bus i to a bus j in a distribution network k during a period t. $\hat{Q}_{i\to j,t}^{dist,k}$ is operational base points of reactive power from the bus i to the bus j in a distribution network k during the period t, $\hat{V}_{i,t}^{dist,k}$ is an operational base point of voltage magnitude of the bus i during the period t, in which operation data corresponding to lines with similar history load level is selected as the operational base point, $R_{i\to j}^{dist,k}$ is a line resistance from the bus i to the bus j.

The constraints of line transmission capacity of the distribution network are denoted by a formula of:

$$-PL_{i\to j}^{dist,k} \leq p_{i\to j,t}^{dist,k} \leq PL_{i\to j}^{dist,k}, \forall (i\to j) \in L^{dist,k}, \forall t \in T \quad (10)$$

where, $PL_{i\to j}^{dist,k}$ is an active power limit of line from the bus i to the bus j in the distribution network k.

The active power constraints of generators in the distribution network are denoted by a formula of:

$$\underline{PG}_i^{dist,k} \leq pg_{i,t}^{dist,k} \leq \overline{PG}_i^{dist,k}, \forall i \in G^{dist,k}, \forall t \in T \quad (11).$$

(1-2-3) The Boundary Constraints of the Integrated Transmission and Distribution Network The boundary constraints of the integrated transmission and distribution network aims to get a balance between an active power sent from the transmission network and an active power received by the at least one distribution network at each dispatching period.

The boundary constraints of the integrated transmission and distribution network are denoted by a formula of:

$$pb_{I(k),t}^{trans} = pb_t^{dist,k}, \forall k \in DIST, \forall t \in T \quad (12)$$

where, $pb_{i,t}^{trans}$ is a transferred real power at a bus i of the transmission network to the at least one distribution network during a period t, I(k) is a bus in the distribution connected to the distribution network k, $pb_t^{dist,k}$ is a transferred real power from the transmission network to the distribution network k during the period t.

(2) The Dispatch Model Established in (1) is Transformed into a Dispatch Model in a Matrix Form.

In detail, the dispatch model is transformed into the dispatch model in the matrix form by a formula of:

$$\min C^{trans}(x^{trans}) + \sum_{k \in DIST} C^{dist,k}(x^{dist,k}) \quad (13)$$

subject to, $A^k x^{trans} + B^k x^{dist,k} \leq c^k$ $x^{trans} \in X^{trans}$ $x^{dist,k} \in X^{dist,k}, \quad \forall k \in DIST$ where, $C^{trans}(x^{trans})$ is an objective function of the transmission network, $C^{dist,k}(x^{dist,k})$ is an objective function of the distribution network k, $X^{trans}$ is a constraint set corresponding to the transmission network, $X^{dist,k}$ is a constraint set corresponding to the distribution network k, $A^k x^{trans} + B^k x^{dist,k} \leq c^k$ is the boundary constraint, $A^k$, $B^k$, and $c^k$ are a coefficient of the transmission network, a coefficient of the distribution network k, and a constant coefficient respectively, wherein, values of columns corresponding to $Pb_{j(k),t}^{trans}$ in $A^k$ are 1, and values of other columns in $A^k$ are 0, values of columns corresponding to $pb_t^{dist,k}$ in $B^k$ are −1, and values of other columns in $B^k$ are 0, and $c^k$ is 0.

(3) The Dispatch Model in the Matrix Form Obtained in (2) is Solved

Figure 2:
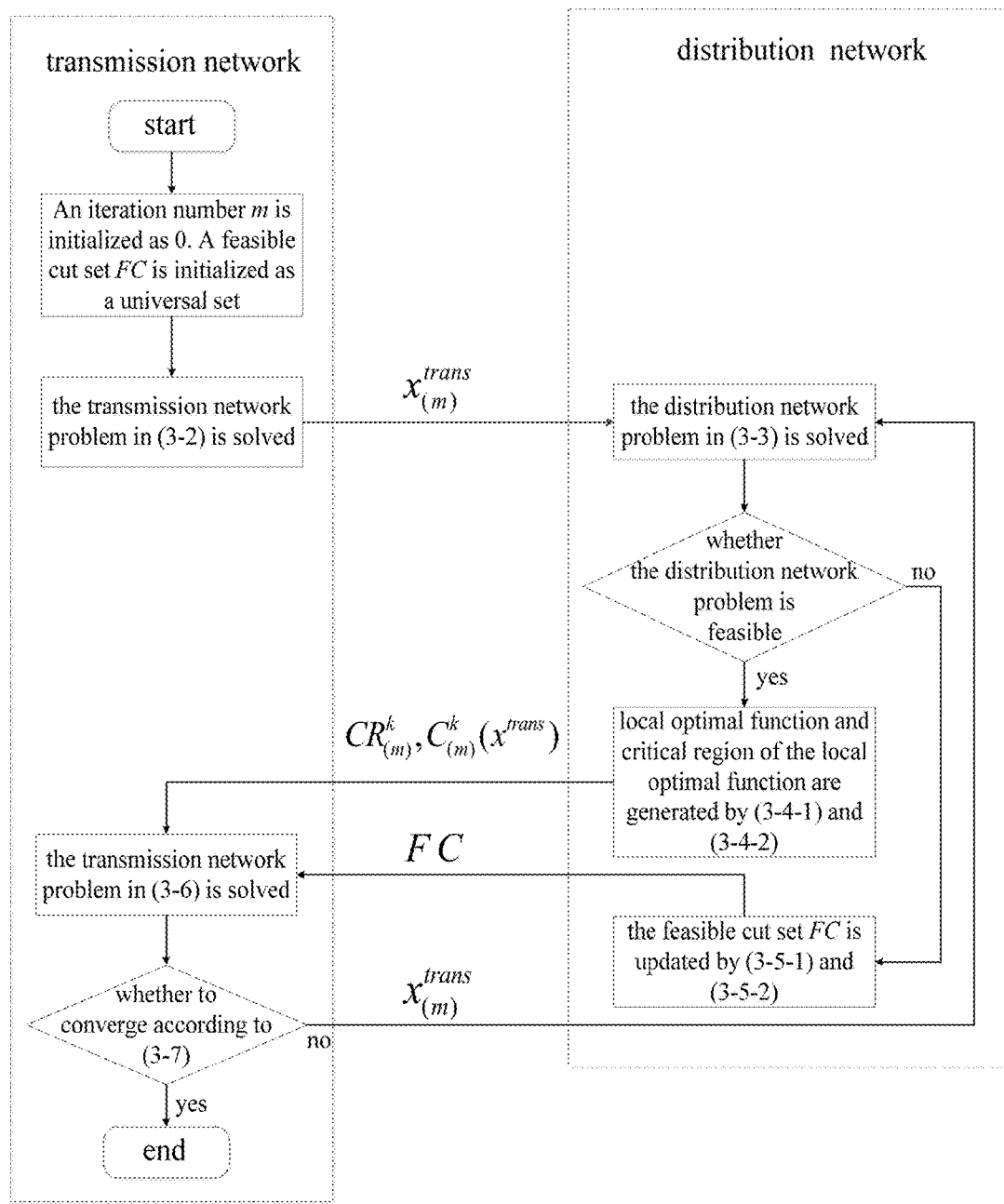
FIG. 2 is a flow chart of a method for solving a dispatch model according to another exemplary embodiment.

FIG. 2 is a flow chart of a method for solving a dispatch model according to another exemplary embodiment. As illustrated in FIG. 2, the method includes followings.

(3-1) An iteration number m is initialized as 0. A feasible cut set FC is initialized as a universal set.

(3-2) A solution $x_{(m)}^{trans}$ of real power of the transmission network is obtained by solving a formula of:

$$\min C^{trans}(x^{trans})$$

subject to, $x^{trans} \in X^{trans}$ $x^{trans} \in FC \quad (14).$ (3-3) It is determined whether there is a solution of real power for each distribution network denoted as $x_{(m)}^{dist,k}$ by solving a distribution network problem denoted as (taking the $k^{th}$ distribution network as an example):

$$\min C^{dist,k}(x^{dist,k})$$

subject to, $A^k x_{(m)}^{trans} + B^k x^{dist,k} \leq c^k$ $x^{dist,k} \in X^{dist,k} \quad (15).$ If yes, (3-4) is executed, other wise (3-5) is executed.

(3-4) A local optimal function $C_{(m)}^k(x^{trans})$ and a critical region $CR_{(m)}^k$ of the local optimal function $C_{(m)}^k(x^{trans})$ are determined.

Physical significance of $C_{(m)}{}^k(x^{trans})$ and $CR_{(m)}{}^k$ is in a critical region of the local optimal objective function, the local optimal objective function can completely represent a relationship between the objective function of the distribution network and boundary variables. A method for determining the local optimal objective function $C_{(m)}{}^k(x^{trans})$ and the critical region $CR_{(m)}{}^k$ of the locally optimal function $C_{(m)}{}^k(x^{trans})$ may include followings.

(3-4-1) Formula (15) is reformulated into a standard quadratic programming form by a formula of:

$$\min \tfrac{1}{2}(x^{dist,k})^T Q(x^{dist,k}) + f^T x^{dist,k} + r$$

$$\text{subject to, } \hat{A}x_{(m)}{}^{trans} + \hat{B}x^{dist,k} \leq \hat{c} \tag{17}$$

wherein, Q is a quadratic matrix $$\sum_{t \in T} \sum_{k \in DIST} \sum_{i \in G^{dist,k}} C_i^{dist,k}(pg_{i,t}^{dist,k}),$$

f is a linear vector of $$\sum_{t \in T} \sum_{k \in DIST} \sum_{i \in G^{dist,k}} C_i^{dist,k}(pg_{i,t}^{dist,k}),$$

and r is a constant coefficient of $$\sum_{t \in T} \sum_{k \in DIST} \sum_{i \in G^{dist,k}} C_i^{dist,k}(pg_{i,t}^{dist,k}),$$

elements on diagonals of the quadratic matrix Q and corresponding to $pg_{i,t}^{dist,k}$ are $a_{2,i}$, other elements in the quadratic matrix Q are 0, elements in the linear vector f and corresponding to $pg_{i,t}^{dist,k}$ are $a_{1,i}$, other elements in the linear vector f are 0, the constant coefficient r is $$\sum_{t \in T} \sum_{k \in DIST} \sum_{i \in G^{dist,k}} a_{0,i},$$

$\hat{A}$ is coefficients of the transmission network in a constraint set comprising the constraints of the at least one distribution network and the boundary constraint, $\hat{B}$ is coefficients of the distribution network in the constraint set comprising the constraints of the at least one distribution network and the boundary constraint, $\hat{c}$ is constant coefficients in the constraint set comprising the constraints of the at least one distribution network and the boundary constraint.

In some embodiments, $\hat{A}$, $\hat{B}$, and $\hat{c}$ are obtained according to the power flow constraint, the constraint of line transmission capacity of the distribution network, the active power constraint of generators in the distribution network, and the boundary constraint.

In detail, a process of obtaining $\hat{A}$, $\hat{B}$, and $\hat{c}$ according to the power flow constraint, the constraint of line transmission capacity of the distribution network, the active power constraint of generators in the distribution network, and the boundary constraint includes followings. The power flow constraint, the constraint of line transmission capacity of the distribution network, the active power constraint of generators in the distribution network, and the boundary constraint are reformulated in a form of a standard matrix inequality.

Columns corresponding to $x_{(m)}{}^{trans}$ in the standard matrix inequality generates $\hat{A}$, columns corresponding to $x^{dist,k}$ in the standard matrix inequality generates $\hat{B}$, and right elements of the standard matrix inequality generates $\hat{c}$.

(3-4-2) Active constraints on a solution of formula (17) and inactive constraints on the solution of formula (17) are determined.

(3-4-3) The local optimal function and the feasible region of the local optimal function are obtained according to the active constraints on the solution of formula (17) and the inactive constraints on the solution of formula (17).

The feasible region $CR_{(m)}{}^k$ of the local optimal function is denoted by a formula of:

$$CR_{(m)}{}^k = \{x^{trans} | K_1 x^{trans} \geq K_2, (\hat{A}_I + \hat{B}_I M_1 K_1) x^{trans} \leq \hat{c}_I - \hat{B}_I(M_1 K_2 + M_2)\} \tag{18}$$

and, the local optimal function $C_{(m)}{}^k(x^{trans})$ is denoted by a formula of:

$$C_{(m)}^k(x^{trans}) = \tfrac{1}{2}(x^{trans})^T (K_1^T M_1^T Q M_1 K_1)(x^{trans}) + \\ (f^T M_1 K_1 + (M_1 K_2 + M_2)^T Q M_1 K_1) x^{trans} + \\ \left( r + f^T (M_1 K_2 + M_2) + \tfrac{1}{2}(M_1 K_2 + M_2)^T Q (M_1 K_2 + M_2) \right), \tag{19}$$

$$M_1 = -Q^{-1} \hat{B}_A^T, \quad M_2 = -Q^{-1} f$$

where, $K_1 = -(\hat{B}_A M_1)^{-1} \hat{A}_A$, $K_2 = -(\hat{B}_A M_1)^{-1}(\hat{B}_A M_2 - \hat{c}_A)$, in which, a subscript $(\bullet)_A$ represents the active constraints on the solution of formula (17), and a subscript $(\bullet)_I$ represents the inactive constraints on the solution of formula (17).

(3-5) A feasible cut is generated and the feasible cut set FC is updated.

In detail (3-5) includes followings.

(3-5-1) A modified dual problem of the distribution network problem is solved to obtain a solution $\omega_0$, in which the modified dual problem is denoted as a formula of:

$$\min \omega^T (\hat{c} - \hat{A} x_{(m)}{}^{trans})$$

$$\text{s.t. } \omega^T \hat{B} = 0$$

$$0 \leq \omega \leq 1 \tag{20}$$

(3-5-2) The feasible cut set FC is updated according to a formula of:

$$FC = FC \cap \{x^{trans} | \omega_0^T \hat{A} x^{trans} \leq \omega_0^T \hat{c}\}.$$

(3-6) A solution of real power of the transmission network is obtained by solving a transmission network problem denoted as:

$$\min C^{trans}(x^{trans}) + \sum_{k \in DIST_{(m)}} C_{(m)}^k(x^{trans}) \tag{16}$$

$$\text{subject to, } x^{trans} \in X^{trans}$$

$$x^{trans} \in FC$$

$$x^{trans} \in CR_{(m)}^k, \quad \forall k \in DIST_{(m)}$$

where, $DIST_{(m)}$ is an index set of the at least one distribution network whose corresponding sub-problem is feasible during $m^{th}$ iteration.

And then, the iteration number m is increased by 1, and the optimal solution of real power output of the transmission network is denoted as $x_{(m)}{}^{trans}$.

(3-7) If the distribution network problem is feasible, and a difference between an $m^{th}$ solution and an $(m-1)^{th}$ solution of real power of the transmission network is less than a preset threshold, the obtained solution of real power of the transmission network and the solution of real power of the plurality of distribution networks are determined as the dynamic dispatch parameters of the integrated transmission and distribution network.

(3-8) If there is no solution of real power for each distribution network, or the difference between the $m^{th}$ solution and the $(m-1)^{th}$ solution of real power of the transmission network is larger than or equal to a preset threshold, return to (3-3).

Embodiments of the present disclosure further provide a dispatching device for an integrated transmission and distribution network. The device includes: a processor; and a memory for storing instructions executable by the processor. The processor is configured to perform the above method.

Embodiments of the present disclosure further provide a non-transitory computer readable storage medium. The non-transitory computer readable storage medium according to embodiments of the present disclosure may include instructions that, when executed by a processor of an apparatus, causes the apparatus to execute the above method.

The technical solutions provided by embodiments of the present disclosure have following advantageous effects.

In the technical solutions of the present disclosure, the dispatch model of the integrated transmission and distribution network can be established by combining the dispatch model of the transmission network, the dispatch model of the distribution network, and a dual coupling relationship between the transmission network and the distribution network. An iterative algorithm for solving the proposed dispatch model of the integrated transmission and distribution network using the multi-parameter programming is provided. The provided algorithm has a well rate of convergence, which can solve a power mismatch problem between the transmission network and the distribution network caused by introducing renewable energy sources, and the global optimal solution of the dispatch model of the integrated transmission and distribution network can be obtained. The provided algorithm may have a good convergence rate and may be applied in practical application.

Any process or method described in the flowing diagram or other means may be understood as a module, segment or portion including one or more executable instruction codes of the procedures configured to achieve a certain logic function or process, and the preferred embodiments of the present disclosure include other performances, in which the performance may be achieved in other orders instead of the order shown or discussed, such as in a almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present disclosure may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods is to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The non-transitory computer-readable storage medium may be, but is not limited to, read-only memories, magnetic disks, or optical disks.

Reference throughout this specification to "an embodiment," "some embodiments," "one embodiment". "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment". "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A dispatching method for an integrated transmission and distribution network, wherein the integrated transmission and distribution network comprises a transmission network and at least one distribution network, the method comprises:

establishing a dispatch model of the integrated transmission and distribution network, wherein the dispatch model comprises an objective function and constraints, the objective function is a minimizing function of a total generation cost of the transmission network and the at least one distribution network under the constraints;

solving the dispatch model to obtain dynamic dispatch parameters for the integrated transmission and distribution network; and dispatching the integrated transmission and distribution network according to the dynamic dispatch parameters;

wherein the total generation cost of the transmission network and the at least one distribution network is established by a formula of:

$$\sum_{t \in T} \sum_{i \in G^{trans}} C_i^{trans}(pg_{i,t}^{trans}) + \sum_{t \in T} \sum_{k \in DIST} \sum_{i \in G^{dist,k}} C_i^{dist,k}(pg_{i,t}^{dist,k}) \quad (1)$$

where, T is an index set of dispatching time horizon, $G^{trans}$ is an index set of generator bus numbers in the transmission network, DIST is an index set of the at least one distribution network, $G^{dist,k}$ is an index set of generator bus numbers in a distribution network k, $C_i^{trans}(pg_{i,t}^{trans})$ is a cost function of a generator at a bus i of the transmission network during a period t, $pg_{i,t}^{trans}$ is a real power output of the generator at the bus i of the transmission network during the period t, $C_i^{dist,k}(pg_{i,t}^{dist,k})$ is a cost function of a generator at a bus i of the distribution network k during the period t, $pg_{i,t}^{dist,k}$ is a real power output of the generator at the bus i of the distribution network k during the period t.

2. The method according to claim 1, wherein $C_i^{trans}(pg_{i,t}^{trans})$ is expressed as:

$$C_i^{trans}(pg_{i,t}^{trans}) = a_{0,i}^{trans} + a_{1,i}^{trans} pg_{i,t}^{trans} + a_{2,i}^{trans}(pg_{i,t}^{trans})^2 \quad (2),$$

where, $a_{0,i}^{trans}$ is a constant coefficient of generation cost of the generator at the bus i of the transmission network, $a_{1,i}^{trans}$ is a linear coefficient of generation cost of the generator at the bus i of the transmission network, and $a_{2,i}^{trans}$ is a quadratic coefficient of generation cost of the generator at the bus i of the transmission network.

3. The method according to claim 1, wherein $C_i^{dist,k}(pg_{i,t}^{dist,k})$ is expressed as:

$$C_i^{dist,k}(pg_{i,t}^{dist,k}) = a_{0,i}^{dist,k} + a_{1,i}^{dist,k} pg_{i,t}^{dist,k} + a_{2,i}^{dist,k}(pg_{i,t}^{dist,k})^2 \quad (3),$$

where, $a_{0,i}^{dist,k}$ is a constant coefficient of generation cost of the generator at the bus i of the distribution network k, $a_{1,i}^{dist,k}$ is a linear coefficient of generation cost of the generator at the bus i of the distribution network k, and $a_{2,i}^{dist,k}$ is a quadratic coefficient of generation cost of the generator at the bus i of the distribution network k.

4. The method according to claim 1, wherein the constraints comprise constraints of the transmission network, constraints of the at least one distribution network, and boundary constraints;

the constraints of the transmission network comprise power balance constraints, constraints of line transmission capacity of the transmission network, spinning reserve constraints, ramping constraints, and active power constraints of generators in the transmission network;

the constraints of the at least one distribution network comprise power flow constraints, constraints of line transmission capacity of each distribution network, and active power constraints of generators in each distribution network.

5. The method according to claim 4, wherein the power balance constraints are denoted by a formula of $$\sum_{i \in G^{trans}} pg_{i,t}^{trans} = \sum_{i \in B^{trans}} pb_{i,t}^{trans} + \sum_{i \in D^{trans}} PD_{i,t}^{trans}, \forall t \in T \quad (4)$$

where, T is an index set of dispatching time horizon, $G^{trans}$ is an index set of generator bus numbers in the transmission network, $pg_{i,t}^{trans}$ is a real power output of the generator at a bus i of the transmission network during a period t, $B^{trans}$ is an index set of boundary bus numbers between the transmission network and the at least one distribution network, $pb_{i,t}^{trans}$ is a transferred real power at the bus i of the transmission network to the at least one distribution network during the period t, $D^{trans}$ is an index set of load bus numbers of the transmission network, $PD_{i,t}^{trans}$ is a load predication value at the bus i during the period t;

the constraints of line transmission capacity of the transmission network are denoted by a formula of $$-PL_n^{trans} \leq \sum_{i \in G^{trans}} SF_{n-i}^{trans} pg_{i,t}^{trans} - \quad (5)$$
$$\sum_{i \in B^{trans}} SF_{n-i}^{trans} pb_{i,t}^{trans} - \sum_{i \in D^{trans}} SF_{n-i}^{trans} PD_{i,t}^{trans} \leq PL_n^{trans},$$
$$\forall n \in L^{trans}, \forall t \in T$$

where, $PL_n^{trans}$ is an active power flow limit of a line n in the transmission network, $SF_{n-i}^{trans}$ is a shift distribution factor of the bus i on the line n, the shift distribution factor is a topological parameter of the integrated transmission and distribution network, $L^{trans}$ is an index set of line numbers of the transmission network;

the spinning reserve constraints are denoted by a formula of, $$0 \leq ru_{i,t}^{trans} \leq RU_i^{trans} \Delta t, ru_{i,t}^{trans} \leq \overline{PG_i^{trans}} - pg_{i,t}^{trans}, \quad (6)$$
$$\forall i \in G^{trans}, \forall t \in T$$
$$0 \leq rd_{i,t}^{trans} \leq RD_i^{trans} \Delta t, rd_{i,t}^{trans} \leq pg_{i,t}^{trans} - \underline{PG_i^{trans}},$$
$$\forall i \in G^{trans}, \forall t \in T$$
$$\sum_{i \in G^{trans}} ru_{i,t}^{trans} \geq SRU_i^{trans}, \sum_{i \in G^{trans}} rd_{i,t}^{trans} \geq SRD_i^{trans},$$
$$\forall t \in T$$

where, $ru_{i,t}^{trans}$ is an upward spinning reserve contribution of the generator at the bus i of the transmission network during the period t, $rd_{i,t}^{trans}$ is a downward spinning reserve contribution of the generator at the bus i of the transmission network during the period t, $RU_i^{trans}$ is an upward ramp rate of the generator at the bus i of the transmission network during the period t, $RD_i^{trans}$ is a downward ramp rate of the generator at the bus i of the transmission network during the period trans t, $\Delta t$ is a time interval for dispatching, $\overline{PG_i}^{trans}$ is a maximum real power output of the generator at the bus i of the transmission network, $\underline{PG_i}^{trans}$ is a minimum real power output of the generator at the bus i of the transmission network, $SRU_t^{trans}$ is an upward spinning reserve capacity requirement of the transmission network during the period t, $SRD_t^{trans}$ is a downward spinning reserve capacity requirement of the transmission network during the period t;

the ramping constraints are denoted by a formula of $$-RD_i^{trans}\Delta t \leq pg_{i,t+1}^{trans} - pg_{i,t}^{trans} \leq RU_i^{trans}\Delta t,$$
$$\forall i \in G^{trans}, \forall t \in T \quad (7); \text{ and}$$

the active power constraints of generators in the transmission network are denoted by a formula of $$\underline{PG_i}^{trans} \leq pg_{i,t}^{trans} \leq \overline{PG_i}^{trans}, \forall i \in G^{trans}, \forall t \in T \quad (8).$$

6. The method according to claim 4, wherein the power flow constraints are denoted by a formula of $$\sum_{i:i \to j}(p_{i \to j,t}^{dist,k} - l_{i \to j,t}^{dist,k}) + p_{j,t}^{dist,k} = \sum_{m:j \to m}p_{j \to m,t}^{dist,k}, \quad (9)$$
$$\forall j \in N^{dist,k}, \forall t \in T$$

where, T is an index set of dispatching time horizon, $p_{i \to j,t}^{dist,k}$ is a line flow from a bus i to a bus j in a distribution network k during a period t, $l_{i \to j,t}^{dist,k}$ is a line loss from the bus i to the bus j in the distribution network k during the period t, $p_{j,t}^{dist,k}$ is an power injection at the bus j in the distribution network k during the period t, $N^{dist,k}$ is an index set of bus numbers of the distribution network k;

the constraints of line transmission capacity of the distribution network are denoted by a formula of $$-PL_{i \to j}^{dist,k} \leq p_{i \to j,t}^{dist,k} \leq PL_{i \to j}^{dist,k}, \forall (i \to j) \in L^{dist,k},$$
$$\forall t \in T \quad (10)$$

where, $PL_{i \to j}^{dist,k}$ is an active power limit of line from the bus i to the bus j in the distribution network k; and the active power constraints of generators in the distribution network are denoted by a formula of $$\underline{PG_j}^{dist,k} \leq pg_{j,t}^{dist,k} \leq \overline{PG_j}^{dist,k}, \forall i \in G^{dist,k}, \forall t \in T \quad (11).$$

7. The method according to claim 6, wherein $p_{j,t}^{dist,k}$ is obtained according to a formula of $$p_{j,t}^{dist,k} = \begin{cases} pg_{j,t}^{dist,k} - PD_{j,t}^{dist,k} + pb_t^{dist,k}, \\ \quad j \text{ is connected to the } k^{th} \text{ distribution network} \\ pg_{j,t}^{dist,k} - PD_{j,t}^{dist,k}, \\ \quad j \text{ is not connected to the } k^{th} \text{ distribution network} \end{cases},$$

$\forall j \in N^{dist,k}, \forall t \in T$, where $pg_{j,t}^{dist,k}$ is a real power output of the generator at the bus j of the distribution network k during the period t, $PD_{j,t}^{dist,k}$ is a load predication value at the bus j of the distribution network k during the period t, and $pb_t^{dist,k}$ is a transferred real power from the transmission network to the distribution network k during the period t.

8. The method according to claim 6, wherein $l_{i \to j,t}^{dist,k}$ is obtained according to a formula of $$l_{i \to j,t}^{dist,k} = [(\hat{P}_{i \to j,t}^{dist,k})^2 + (\hat{Q}_{i \to j,t}^{dist,k})^2]R_{i \to j}^{dist,k}/(\hat{V}_{i,t}^{dist,k})^2,$$
$$+2(p_{i \to j,t}^{dist,k} - \hat{P}_{i \to j,t}^{dist,k})\hat{P}_{i \to j,t}^{dist,k}R_{i \to j}^{dist,k}/(\hat{V}_{i,t}^{dist,k})^2,$$
$$\forall (i \to j) \in L^{dist,k}, \forall t \in T$$

where, $\hat{P}_{i \to j,t}^{dist,k}$ is operational base points of real power from the bus i to the bus j in a distribution network k during a period t, $\hat{Q}_{i \to j,t}^{dist,k}$ is operational base points of reactive power from the bus i to the bus j in a distribution network k during the period t, $\hat{V}_{i,t}^{dist,k}$ is an operational base point of voltage magnitude of the bus i during the period t, $R_{i \to j}^{dist,k}$ is a line resistance from the bus i to the bus j.

9. The method according to claim 4, wherein the boundary constraints are denoted by a formula of $$pb_{I(k),t}^{trans} = pb_t^{dist,k}, \forall k \in DIST, \forall t \in T \quad (12)$$

where, T is an index set of dispatching time horizon, DIST is an index set of the at least one distribution network, $pb_{i,t}^{trans}$ is a transferred real power at a bus i of the transmission network to the at least one distribution network during a period t, I(k) is a bus in the distribution connected to the distribution network k, $pb_t^{dist,k}$ is a transferred real power from the transmission network to the distribution network k during the period t.

10. The method according to claim 1, wherein the dispatch model is transformed into a matrix form by a formula of $$\min C^{trans}(x^{trans}) + \sum_{k \in DIST} C^{dist,k}(x^{dist,k}) \quad (13)$$

subject to, $$A^k x^{trans} + B^k x^{dist,k} \leq c^k$$

$$x^{trans} \in X^{trans}$$

$$x^{dist,k} \in X^{dist,k}, \quad \forall k \in DIST$$

where, $C^{trans}(x^{trans})$ is an objective function of the transmission network, $C^{dist,k}(x^{dist,k})$ is an objective function of the distribution network k, $X^{trans}$ is a constraint set corresponding to the transmission network, $X^{dist,k}$ is a constraint set corresponding to the distribution network k, $A^k x^{trans} + B^k x^{dist,k} \leq c^k$ is the boundary constraint, $A^k$, $B^k$, and $c^k$ are a coefficient of the transmission network, a coefficient of the distribution network k, and a constant coefficient respectively, wherein, values of columns corresponding to $pb_{I(k),t}^{trans}$ in $A^k$ are 1, and values of other columns in $A^k$ are 0, values of columns corresponding to $pb_t^{dist,k}$ in $B^k$ are −1, and values of other columns in $B^k$ are 0, and $c^k$ is 0.

11. The method according to claim 10, wherein solving the dispatch model to obtain dynamic dispatch parameters for the integrated transmission and distribution network comprises:

S1, initializing an iteration number m as 0, and initializing a feasible cut set FC as a universal set;

S2, obtaining a solution $x_{(m)}^{trans}$ of real power of the transmission network by solving a formula of $$\min C^{trans}(x^{trans})$$

subject to, $x^{trans} \in X^{trans}$ $$x^{trans} \in FC \quad (14);$$

S3, determining whether there is a solution of real power for each distribution network denoted as $x_{(m)}^{dist,k}$ by solving a distribution network problem denoted as $$\min C^{dist,k}(x^{dist,k})$$

subject to, $A^k x_{(m)}^{trans} + B^k x^{dist,k} \leq c^k$ $$x^{dist,k} \in X^{dist,k} \quad (15);$$

S4, if yes, determining a local optimal function $C_{(m)}^k(x^{trans})$ and a critical region $CR_{(m)}^k$ of the locally function $C_{(m)}^k(x^{trans})$;

S5, if no, generating a feasible cut and updating the feasible cut set FC;

S6, obtaining a solution of real power of the transmission network by solving a transmission network problem denoted as $$\min C^{trans}(x^{trans}) + \sum_{k \in DIST_{(m)}} C_{(m)}^k(x^{trans}) \quad (16)$$

subject to, $x^{trans} \in X^{trans}$ $x^{trans} \in FC$ $x^{trans} \in CR_{(m)}^k, \quad \forall k \in DIST_{(m)}$ where, $DIST_{(m)}$ is an index set of the at least one distribution network whose corresponding sub-problem is feasible during $m^{th}$ iteration, increasing the iteration number m by 1, and denoting the solution of real power of the transmission network as $x_{(m)}^{trans}$;

S7, if the distribution network problem is feasible, and a difference between an $m^{th}$ solution and an $(m-1)^{th}$ solution of real power of the transmission network is less than a preset threshold, determining obtained solution of real power of the transmission network and obtained solution of real power of the plurality of distribution networks as the dynamic dispatch parameters;

S8, if there is no solution of real power for each distribution network, or the difference between the $m^{th}$ solution and the $(m-1)^{th}$ solution of real power of the transmission network is larger than or equal to a preset threshold, repeating steps S3-S7.

12. The method according to claim 11, wherein determining a local optimal function $C_{(m)}^k(x^{trans})$ and a critical region $CR_{(m)}^k$ of the locally function $C_{(m)}^k(x^{trans})$ comprises:

reformulating formula (15) into a standard quadratic programming form by a formula of $$\min \tfrac{1}{2}(x^{dist,k})^T Q(x^{dist,k}) + f^T x^{dist,k} + r$$

subject to, $\hat{A} x_{(m)}^{trans} + \hat{B} x^{dist,k} \leq \hat{c} \quad (17)$ wherein, Q is a quadratic matrix of $$\sum_{t \in T} \sum_{k \in DIST} \sum_{i \in G^{dist,k}} C_i^{dist,k}(pg_{i,t}^{dist,k}),$$

f is a linear vector of $$\sum_{t \in T} \sum_{k \in DIST} \sum_{i \in G^{dist,k}} C_i^{dist,k}(pg_{i,t}^{dist,k}),$$

and r is a constant coefficient of $$\sum_{t \in T} \sum_{k \in DIST} \sum_{i \in G^{dist,k}} C_i^{dist,k}(pg_{i,t}^{dist,k}),$$

elements on diagonals of the quadratic matrix Q and corresponding to $pg_{i,t}^{dist,k}$ are $a_{2,i}$, other elements in the quadratic matrix Q are 0, elements in the linear vector f and corresponding to $pg_{i,t}^{dist,k}$ are $a_{1,i}$, other elements in the linear vector f are 0, the constant coefficient r is $$\sum_{t \in T} \sum_{k \in DIST} \sum_{i \in G^{dist,k}} a_{0,i},$$

$\hat{A}$ is coefficients of the transmission network in a constraint set comprising the constraints of the at least one distribution network and the boundary constraint, $\hat{B}$ is coefficients of the distribution network in the constraint set comprising the constraints of the at least one distribution network and the boundary constraint, $\hat{c}$ is constant coefficients in the constraint set comprising the constraints of the at least one distribution network and the boundary constraints;

determining active constraints on a solution of formula (17) and inactive constraints on the solution of formula (17);

obtaining the local optimal function and the feasible region of the local optimal function according to the active constraints on the solution of formula (17) and the inactive constraints on the solution of formula (17), wherein the feasible region $CR_{(m)}^k$ of the local optimal function is denoted by a formula of:

$$CR_{(m)}^k = \{x^{trans} | K_1 x^{trans} \geq K_2, (\hat{A}_I + \hat{B}_I M_1 K_1) x^{trans} \leq \hat{c}_I - \hat{B}_I (M_1 K_2 + M_2)\} \quad (18),$$

and the local optimal function $C_{(m)}^k(x^{trans})$ is denoted by a formula of:

$$C_{(m)}^k(x^{trans}) = \tfrac{1}{2}(x^{trans})^T (K_1^T M_1^T Q M_1 K_1)(x^{trans}) + \quad (19)$$
$$(f^T M_1 K_1 + (M_1 K_2 + M_2)^T Q M_1 K_1) x^{trans} +$$
$$\left( r + f^T (M_1 K_2 + M_2) + \tfrac{1}{2}(M_1 K_2 + M_2)^T Q(M_1 K_2 + M_2) \right)$$

$$M_1 = -Q^{-1} \hat{B}_A^T, \quad M_2 = -Q^{-1} f,$$

where, $K_1 = -(\hat{B}_A M_1)^{-1} \hat{A}_A, K_2 = -(\hat{B}_A M_1)^{-1} (\hat{B}_A M_2 - \hat{c}_A),$ wherein, a subscript $(\Box)_A$ represents the active constraints on the solution of formula (17), and a subscript $(\Box)_I$ represents the inactive constraints on the solution of formula (17).

13. The method according to claim 12, further comprising:

obtaining $\hat{A}$, $\hat{B}$, and $\hat{c}$ according to the power flow constraint, the constraint of line transmission capacity of the distribution network, the active power constraint of generators in the distribution network, and the boundary constraint;

wherein, obtaining $\hat{A}$, $\hat{B}$, and $\hat{c}$ according to the power flow constraint, the constraint of line transmission capacity of the distribution network, the active power constraint of generators in the distribution network, and the boundary constraint comprises:

reformulating the power flow constraint, the constraint of line transmission capacity of the distribution network, the active power constraint of generators in the distribution network, and the boundary constraint in a form of a standard matrix inequality, where, columns corresponding to $x_{(m)}^{trans}$ in the standard matrix inequality generates $\hat{A}$, columns corresponding to $x^{dist,k}$ in the standard matrix inequality generates $\hat{B}$, right elements of the standard matrix inequality generates $\hat{c}$.

14. The method according to claim 11, wherein generating a feasible cut and updating the feasible cut set FC comprises:
solving a modified dual problem of the distribution network problem to obtain a solution $\omega_0$, wherein the modified dual problem is denoted as a formula of:

$$\min \omega^T(\hat{c} - \hat{A}x_{(m)}^{trans})$$

$$\text{s.t. } \omega^T\hat{B} = 0$$

$$0 \leq \omega \leq 1 \quad (20);$$

updating the feasible cut set FC according to a formula of:

$$FC = FC \cap \{x^{trans} | \omega_0^T \hat{A} x^{trans} \leq \omega_0^T \hat{c}\}.$$

15. A dispatching device for an integrated transmission and distribution network, wherein the integrated transmission and distribution network comprises a transmission network and at least one distribution network, and the device comprises:
a processor; and
a memory for storing instructions executable by the processor,
wherein the processor is configured to:
establish a dispatch model of the integrated transmission and distribution network, wherein the dispatch model comprises an objective function and constraints, the objective function is a minimizing function of a total generation cost of the transmission network and the at least one distribution network under the constraints;
solve the dispatch model to obtain dynamic dispatch parameters for the integrated transmission and distribution network; and
dispatch the integrated transmission and distribution network according to the dynamic dispatch parameters;
wherein the total generation cost of the transmission network and the at least one distribution network is established by a formula of:

$$\sum_{t \in T} \sum_{i \in G^{trans}} C_i^{trans}(pg_{i,t}^{trans}) + \sum_{t \in T} \sum_{k \in DIST} \sum_{i \in G^{dist,k}} C_i^{dist,k}(pg_{i,t}^{dist,k}) \quad (1)$$

where, T is an index set of dispatching time horizon, $G^{trans}$ is an index set of generator bus numbers in the transmission network, DIST is an index set of the at least one distribution network, $G^{dist,k}$ is an index set of generator bus numbers in a distribution network k, $C_i^{trans}(pg_{i,t}^{trans})$ is a cost function of a generator at a bus i of the transmission network during a period t, $pg_{i,t}^{trans}$ is a real power output of the generator at the bus i of the transmission network during the period t, $C_i^{dist,k}(pg_{i,t}^{dist,k})$ is a cost function of a generator at a bus i of the distribution network k during the period t, $pg_{i,t}^{dist,k}$ is a real power output of the generator at the bus i of the distribution network k during the period t.

16. The device according to claim 15, wherein the constraints comprise constraints of the transmission network, constraints of the at least one distribution network, and boundary constraints;
the constraints of the transmission network comprise power balance constraints, constraints of line transmission capacity of the transmission network, spinning reserve constraints, ramping constraints, and active power constraints of generators in the transmission network;
the constraints of the at least one distribution network comprise power flow constraints, constraints of line transmission capacity of each distribution network, and active power constraints of generators in each distribution network.

17. A non-transitory computer-readable storage medium having stored therein instructions that, when executed by a processor of a computer, causes the computer to perform a dispatching method for an integrated transmission and distribution network, wherein the integrated transmission and distribution network comprises a transmission network and at least one distribution network, the method comprises:
establishing a dispatch model of the integrated transmission and distribution network, wherein the dispatch model comprises an objective function and constraints, the objective function is a minimizing function of a total generation cost of the transmission network and the at least one distribution network under the constraints;
solving the dispatch model to obtain dynamic dispatch parameters for the integrated transmission and distribution network; and
dispatching the integrated transmission and distribution network according to the dynamic dispatch parameters;
wherein the total generation cost of the transmission network and the at least one distribution network is established by a formula of:

$$\sum_{t \in T} \sum_{i \in G^{trans}} C_i^{trans}(pg_{i,t}^{trans}) + \sum_{t \in T} \sum_{k \in DIST} \sum_{i \in G^{dist,k}} C_i^{dist,k}(pg_{i,t}^{dist,k}) \quad (1)$$

where, T is an index set of dispatching time horizon, $G^{trans}$ is an index set of generator bus numbers in the transmission network, DIST is an index set of the at least one distribution network, $G^{dist,k}$ is an index set of generator bus numbers in a distribution network k, $C_i^{trans}(pg_{i,t}^{trans})$ is a cost function of a generator at a bus i of the transmission network during a period t, $pg_{i,t}^{trans}$ is a real power output of the generator at the bus i of the transmission network during the period t, $C_i^{dist,k}(pg_{i,t}^{dist,k})$ is a cost function of a generator at a bus i of the distribution network k during the period t, $pg_{i,t}^{dist,k}$ is a real power output of the generator at the bus i of the distribution network k during the period t.

* * * * *